United States Patent Office 2,967,779
Patented Jan. 10, 1961

2,967,779
OPTICAL GLASS

Tetsuro Izumitani, Osaka City, Japan, assignor to the Director of the Agency of Industrial Science and Technology, the Ministry of International Trade and Industry, Japanese Government, Tokyo, Japan No Drawing. Filed Mar. 24, 1958, Ser. No. 723,092

Claims priority, application Japan Nov. 20, 1957

3 Claims. (Cl. 106—54)

The present invention relates to improved optical glass and particularly to cadmium-lanthanum-borate glass having a high refractive index and a moderate Abbe value.

The object of the invention is to provide a glass of greater stability, of greater resistance to devitrification in particular, during manufacture of the glass itself.

The cadmium-lanthanum-borate system is known as a glass of a high refractive index and a moderate Abbe value. But the glass is unstable, having a tendency to devitrify during manufacture of the glass itself, and the melt fails to vitrify when the boric oxide present is confined to no more than 24 weight percent. The present inventor, however, has found that this tendency to devitrification may be eliminated on an industrial basis and without reducing the refractive index by the employment of one or both of titanium oxide and tungsten oxide in addition to silicon dioxide and zirconium oxide when such components are added to a glass consisting of 18 to 23 percent by weight of boric oxide and less than 90 percent by weight of the oxides of cadmium, lanthanum and boron taken together. The Abbe value is maintained on a moderate level. In some instances, tantalum oxide is used in the stead of a portion of cadmium oxide to further raise the refractive index.

According to the invention, the glass batch from which the glass is made contains oxides in the following percentages by weight:

| | Percent by weight |
|---|---|
| Boric oxide | 18 to 23 |
| Cadmium oxide | 28 to 45 |
| Lanthanum oxide | 20 to 34 |
| Tantalum oxide | 0 to 7 |
| Silicon dioxide | 3 to 5 |
| Zirconium oxide | 2 to 7 | and one or both in particular of

| | |
|---|---|
| Titanium oxide | 2 to 6 |
| Tungsten oxide | 2 to 4 | and the glass consists of less than 90 percent by weight of the total of the weights of the oxides of cadmium, lanthanum and boron.

The melt containing less than 3 weight percent of silicon dioxide and less than 2 weight percent of each of zirconium oxide, titanium oxide and tungsten oxide tends to devitrify, and the devitrification is further augmented when zirconium oxide is used in more than 7 weight percent. The batch containing more than 5 weight percent of silicon dioxide is hard to melt, and the batch containing more than 6 weight percent of titanium oxide and more than 4 weight percent of tungsten oxide results in a colored glass. Furthermore, the melt tends to devitrify when the sum of the weights of cadmium oxide, lanthanum oxide and boric oxide reaches more than 90 percent by weight, the total weight of other components being correspondingly reduced.

Preferred embodiments or illustrative examples of the present invention are as follows:

| Example | Components in Weight Percent | | | | | | | | $N_D$ | V |
|---|---|---|---|---|---|---|---|---|---|---|
| | $B_2O_3$ | CdO | $La_2O_3$ | $SiO_2$ | $ZrO_2$ | $TiO_2$ | $WO_3$ | $Ta_2O_5$ | | |
| 1 | 23 | 30 | 30 | 5 | 4 | 6 | 2 | | 1.8237 | 37.3 |
| 2 | 23 | 36 | 27 | 5 | 4 | 2 | 3 | | 1.8011 | 40.6 |
| 3 | 23 | 28 | 34 | 5 | 4 | 2 | 4 | | 1.8078 | 41.0 |
| 4 | 23 | 32 | 29 | 5 | 4 | | 4 | 3 | 1.7928 | 42.7 |
| 5 | 23 | 29 | 28 | 5 | 4 | | 4 | 7 | 1.7942 | 42.2 |
| 6 | 22 | 36 | 27 | 5 | 4 | 6 | | | 1.8300 | 36.8 |
| 7 | 20 | 45 | 20 | 5 | 4 | 6 | | | 1.8403 | 35.1 |
| 8 | 18 | 33 | 30 | 5 | 4 | 6 | 4 | | 1.8585 | 34.9 |
| 9 | 18 | 43 | 20 | 5 | 4 | 6 | 4 | | 1.8548 | 33.7 |

In each of the foregoing examples the total of cadmium oxide, lanthanum oxide and boric oxide is less than 90% by weight of the total glass composition.

As is usual in glass making, various compounds other than oxides may be used. For example, $CdCO_3$ and $H_3BO_3$ may be used for the components CdO and $B_2O_3$ respectively.

In making these glasses, the batch in powdered form is mixed uniformly and placed in a platinum vessel. The melting temperature is in the range of 1,200 to 1,300 deg. C. A fairly fluid liquid results after about a half hour for a melt of the order of 100 grams. The liquid may be refined and shaken or stirred and poured into a mold previously heated to 400 to 500 deg. C. and allowed to cool slowly. The annealing temperature is in the range of 610 to 540 deg. C. The glass thus obtained is clear, either colorless or light yellowish, and the refraction-dispersion chart thereof runs between $N_D$=1.86, V=33.7 and $N_D$=1.79, V=42.7.

I claim:

1. An optical glass composition consisting of 18 to 23 percent by weight of boric oxide, 28 to 45 percent by weight of cadmium oxide, 20 to 34 percent by weight of lanthanum oxide, the total weight of boric oxide, cadmium oxide and lanthanum oxide being less than 90% by weight of the total weight of the composition, and further consisting of 0 to 7 percent by weight of tantalum oxide, 3 to 5 percent by weight of silicon dioxide, 2 to 7 percent by weight of zirconium oxide and 2 to 6 percent by weight of titanium oxide.

2. An optical glass composition consisting of 18 to 23 percent by weight of boric oxide, 28 to 45 percent by weight of cadmium oxide, 20 to 34 percent by weight of lanthanum oxide, the total weight of boric oxide, cadmium oxide and lanthanum oxide being less than 90% by weight of the total weight of the composition, and further consisting of 0 to 7 percent by weight of tantalum oxide, 3 to 5 percent by weight of silicon dioxide, 2 to 7 percent by weight of zirconium oxide and 2 to 4 percent by weight of tungsten oxide.

3. An optical glass composition consisting of 18 to 23 percent by weight of boric oxide, 28 to 45 percent by weight of cadmium oxide, 20 to 34 percent by weight of lanthanum oxide, the total weight of boric oxide, cadmium oxide and lanthanum oxide being less than 90% by weight of the total weight of the composition, and further consisting of 0 to 7 percent by weight of tantalum oxide, 3 to 5 percent by weight of silicon dioxide, 2 to 7 percent by weight of zirconium oxide, 2 to 6 percent by weight of titanium oxide and 2 to 4 percent by weight of tungsten oxide.

References Cited in the file of this patent

UNITED STATES PATENTS

| | | |
|---|---|---|
| 2,430,540 | Sun et al. | Nov. 11, 1947 |
| 2,434,149 | De Paolis | Jan. 6, 1948 |
| 2,523,362 | Fraser | Sept. 26, 1950 |
| 2,584,975 | Armistead | Feb. 12, 1952 |
| 2,678,281 | Geffcken et al. | May 11, 1954 |